United States Patent
Stamy

[11] 3,771,251
[45] Nov. 13, 1973

[54] FISHING LURE

[76] Inventor: David R. Stamy, 18525 Riverside, Birmingham, Mich.

[22] Filed: May 4, 1972

[21] Appl. No.: 250,132

[52] U.S. Cl.................. 43/42.32, 43/42.09, 43/42.5
[51] Int. Cl............................................... A01k 85/00
[58] Field of Search....................... 43/42.32, 42.09, 43/42.5, 42.13, 42.18, 42.33

[56] References Cited
UNITED STATES PATENTS

| | | | |
|---|---|---|---|
| 3,305,964 | 2/1967 | Wieszeck | 43/42.32 X |
| 2,588,720 | 3/1952 | Heiland | 43/42.5 |
| 2,796,693 | 6/1957 | Gunterman | 43/42.32 X |
| 3,296,734 | 1/1967 | Johnson | 43/42.32 X |
| 1,600,652 | 9/1926 | Steenstrup | 43/42.09 |
| 2,003,976 | 6/1935 | Raymond | 43/42.32 X |
| 2,805,512 | 9/1957 | Bunce | 43/42.18 |
| 3,363,358 | 1/1968 | Johansson | 43/42.13 |

Primary Examiner—Louis G. Mancene
Assistant Examiner—James H. Czerwonky
Attorney—Dale A. Winnie

[57] ABSTRACT

A fishing lure comprising a plurality of spoon type lure members collectively nested and engaged together for pivotal relocation of each member in turn from a first position on one side of the group to a second position on the other side of the group. Each member has its opposite side faces of a different color and/or design and their next adjacent side faces of a like color and/or design. Means are provided for retaining the different members in selected nested arrangements and for attaching a leader line and fish hooks thereto.

10 Claims, 5 Drawing Figures

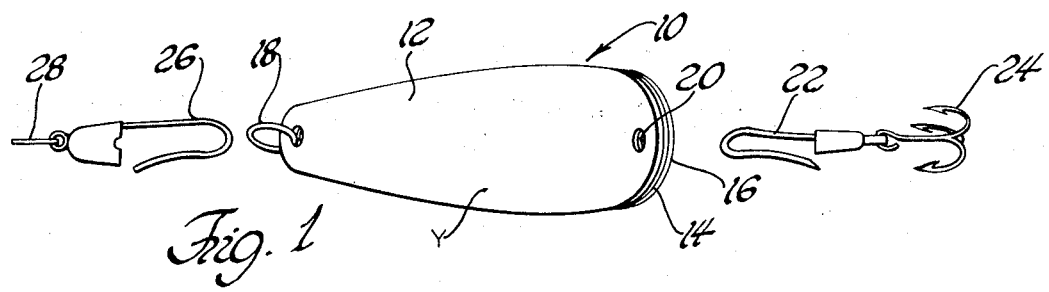
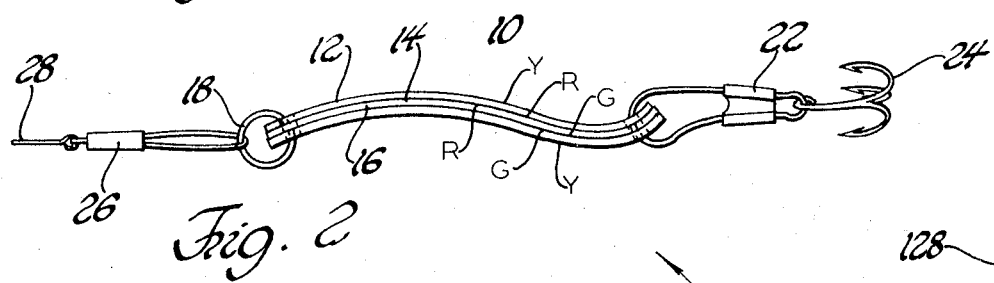
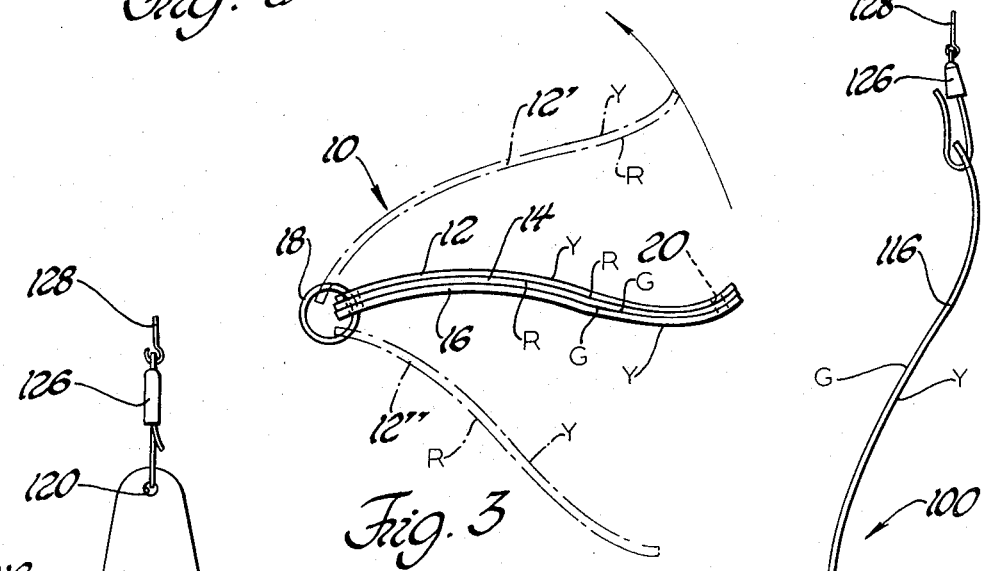
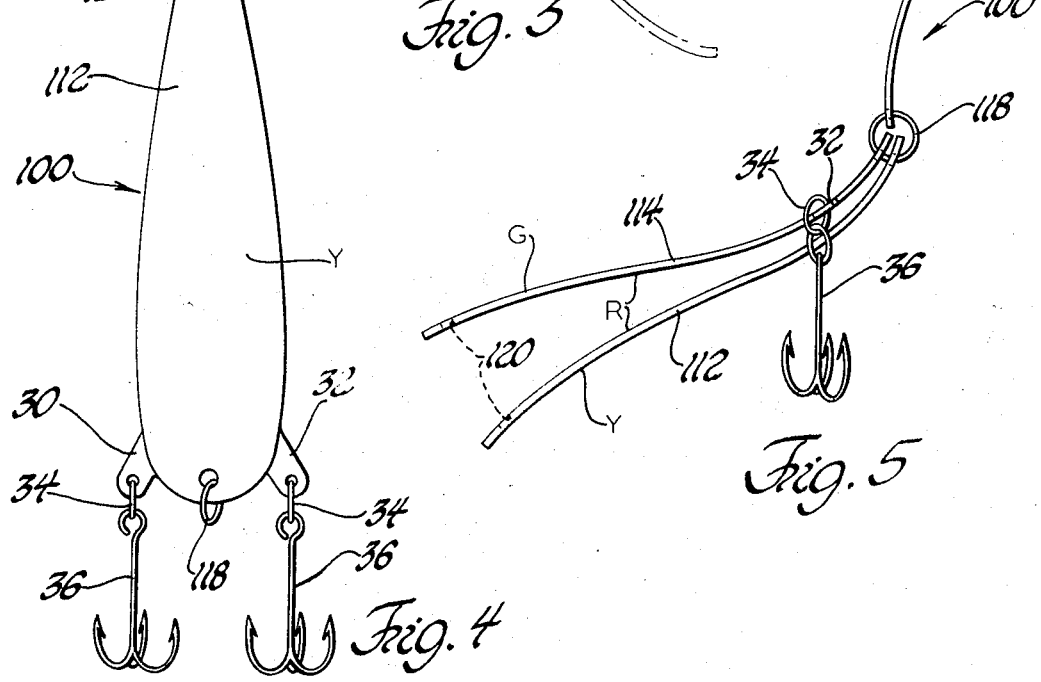

FISHING LURE

BACKGROUND OF THE PRESENT INVENTION:

One of the most popular fishing lures is the so-called spoon type which is generally pear shaped and includes a longitudinally undulant from that causes it to flutter and weave as it is pulled through the water.

Fishermen usually have quite a few of these lure in their tackle box, of varying colors and designs, in order to be able to change them to attract the fish at different times and to attract different kinds of fish.

Although means have been proposed before for changing the appearance of this and other types of fishing lures, as by snap-on or slipover covers of different colors and designs, the basic lure is so relatively inexpensive to manufacture and sell that there has been no cost advantage for the fishermen and in most cases the means and method for changing its appearance have been too complicated to be bothered with. Consequently, every fisherman continues to buy and clutter his tackle box with numerous different colored and appearing spoon lure types, some of which he rarely uses.

SUMMARY OF THE PRESENT INVENTION:

This invention is directed primarily to the spoon-type fishing lure.

A plurality of relatively pear-shaped members longitudinally undulant and of similar dimensional size, shape and thickness are nested and engaged together, preferably near one end, so that each member, in turn, can be pivotally relocated from a first position on one side of the collectively nested group to a second position on the otherside thereof. Each member has its opposite side faces of a different color, or design, and the adjacently disposed faces of the members in the collective group are preferably of a like color and design. Consequently, in relocating one member from one side of the group to the other side, the appearance of the collective group is completely changed from one color or design to another.

As regards manufacturing and material cost, each member is essentially identical and consequently they can be from the same stamping or mold. Since the combination of members comprises the actual lure, it follows also that each member may be of relatively less material thickness, than if a lure by itself, and consequently there is an overall savings in material cost.

In one form of the present invention a collectively nested group of the differently colored lure members are engaged togetehr at one end by a closed ring to which a leader line may be attached and the opposite ends of the members are retained together by a detachable snap fastener including the fish hook to be used.

In another form of the invention shown and described, a collectively nested group of the differently colored lure members are engaged together by a closed ring at the opposite end and the leader line attachment is made by a detachable snap fastener at the other end. And, in this instance, one of the lures is provided with ears which project outwardly to the sides and to which fish hooks may be more permanently attached. Only one of the lure members needs to have the fish hooks attached to it since the others can be pivotally flipped, end-for-end, around and between the hooks, to change the color or design of the overall fishing lure.

DESCRIPTION OF THE DRAWING FIGURES:

FIG. I is a side face plane elevational view of a collectively nested group of the lure members showing leader line and fish hook attachments made by snap fastener means at opposite ends thereof.

FIG. 2 is a side edge view of the lure shown in the first drawing figure with the leader line and fish hook attachments made thereto.

FIG. 3 is a side edge view of a collectively nested group of the lure members and shows in dotted line the pivotal relocation of one thereof from one side to the other of the group.

FIG. 4 is a side face plane elevational view of another form of the present invention showing a different pivotal and fish hook arrangement.

FIG. 5 is a side edge view of the fishing lure shown in the immediately preceding drawing figure in the course of relatively rearranging the different lure members to change the appearance thereof.

DETAILED DESCRIPTION OF THE ILLUSTRATED EMBODIMENTS:

The fishing lure 10 shown in the first three drawing figures includes a plurality of relatively pear-shaped members having a longitudinally undulating form and which are nested together to provide, in combination, the spoon type of fishing lure.

There are three different lure members 12, 14 and 16 in the collectively nested group and each is of a relatively like dimensional size, shape and material thickness. There could be more or less in number and one or more of the members may be of a different gage thickness, or relatively narrower within the teachings of the present invention, but this arrangement is easiest to illustrate and explain.

The different lure members 12, 14 and 16 are engaged together by a closed ring fastener 18 near their smaller end, They may be nested together as shown in the first two drawing figures and they can be rearranged in the manner shown by the third drawing figure. The ring fastener is small but of sufficient size to enable one of the lure members on one side of the collective group to be pivotally relocated around and onto the other side of the collective group.

Each of the lure members 12, 14 and 16 has opposite side faces of a different color and/or design and in their collected group the next adjacent faces of different lure members are of a like color and/or design. This is illustrated in the drawing figures by the use of the letter Y for yellow, R for red and G for gold. Hence, the lure member 12 has one side face yellow and the other red, the lure member 14 has one side face red and the other gold, and the lure member has its side faces gold and yellow.

As nested together, in the manner shown, the collective group of lure members thus show only the yellow outer disposed faces of the lure members 12 and 16.

To change this, lure member 12 may be pivotally relocated from a first position on top of the group to a second position on the bottom, as the dotted line images 12' and 12'' indicate. This then exposes the red side face of lure member 14 and the red side face of lure member 12. Hence, the collective group has been changed from a yellow fishing lure To retain the different lure members in a selected arrangement, each of them is provided with a small hole 20 at their larger end, opposite the ring fastener 18, which is receptive of a snap-hook fastener 22 with a fish hook 24 attached to it.

A like snap-hook fastener 26 on the end of a leader line 28 is readily engaged to the ring fastener 18, at the smaller end of the collectively nested group of lure members, and the combination lure is ready for use.

It will be appreciated that th small ring fastener 18 serves to keep the lure members 12, 14 and 16 in their particular order. But, the snap-hook fastener 26 could serve the same purpose of keeping them in a preselected arrangement and the closed ring could be eliminated if a different color arrangement were desired. Also, that the fastener 18 can be opened to add other lure members, of different or complimentary colors or designs to the combination.

Referring now to FIGS. 4 and 5, another form of the same type of fishing lure is shown and identified as 100. It also includes three lure members 112, 114 and 116, and they have their opposite side faces of respectively different colors and/or designs and their adjacently disposed faces of like colors and/or designs. Again, the letters Y, R and G are used to designate yellow, red and gold, respectively.

In this instance, however, the different lure members 112, 114 and 116 are engaged together and made pivotal with respect to each other by means of a closed ring fastener 118 at their larger end. And they are held and retained together in a pre-selected and nested arrangement by a snap-hook fastener 126, on the end of a leader line 128 that is engaged through a small hole 120 in the smaller end of each lure member.

More importantly, one of the lure members 114 is provided with a pair of ears or tabs, 30 and 32, which project outwardly on each side, a spaced distance up from the ring fastener 118. And each ear is pierced for a ring fastener 34 that holds a fishing hook 36 to it.

The lure members 112 and 116 are still pivotal, end-for-end, around and between the ears 30 and 32 and hooks 36 on the lure member 114, without interference.

The advantage of the arrangement of lure 100, besides carrying double hooks, is that only the one lure 114, that carries the hooks, need be particularly strong and sufficiently weighted for its intended purpose. The other lure members 112 and 116, for example, could be paper thin laminated plastic pieces since their only function is to change the appearance of the overall lure.

This is not to say that one weighted and relatively thicker lure member might not be used in the combination comprising lure 10, and that the others might not be laminar plastic pieces (to obtain opposite faces of different colors), but only to illustrate such difference in lure member construction in a different arrangement.

From the forgoing, it will be appreciated that the individual lure members may be of relatively like dimensional size, shape and material thickness, or that there may be certain variations. They may be fixedly retained together, and made pivotal with respect to each other, or a detachable fastener can be used for this purpose, to permit selected changes. And the lure can carry one or more fish hooks, The combination lure, for the fisherman, provides several options all together in one fishing lure. And, he can make the changes quickly, with digging back into his tackle box.

For the manufacturer, the lure in certain combinations will be less expensive to produce, and will provide greater profits or a more attractive selling price. In other combinations, more exotic designs and embellishments while adding cost, will justify a higher selling price. In every instance three to five lures may be offered in combination for less than their price individually.

I claim:

1. A fishing lure, comprising; a plurality of relatively pear-shaped spoon-like members longitudinally undulant and of relatively similar dimensional size and shape, each member having first and second ends with openings passing respectively therethrough, ring means loosely and pivotally engaging the first ends of said members together in a collectively nested group and passing through their respective openings for pivotal relocation of each member in turn from a first position on one side of said group to a second position on the other side of said group, and means engaging the second ends of said second members and passing through their respective openings for retaining said members in different selected nested arrangements and for attaching a leader and a fish hook to opposite ends of at least one of said members.

2. The fishing lure of claim 1, each of said members having their opposite side faces of a different color for changing the visual appearance of the collectively nested group in the relocation of a member from a first to a second position on opposite sides of said group.

3. The fishing lure of claim 1, said members in a collectively nested group having their adjacently disposed side faces and the outermost side faces of the member on opposite sides of said group of a like color.

4. The fishing lure of claim 1, said members being engaged together and for pivotal relocation at one and the same end of each thereof.

5. The fishing lure of claim 1, said engaging and retaining means being respectively provided at relatively opposite ends of said members in the collectively nested group.

6. The fishing lure of claim 5, said attaching means including at least one of said engaging and retaining means.

7. The fishing lure of claim 2, said engaging and retaining means being detachably provided at relatively opposite ends of said members in the collectively nested group.

8. The fishing lure of claim 3, said engaging means being provided at one end of said members in the collectively nested group, and said retaining means being detachably provided at the relatively opposite ends of said members.

9. The fishing lure of claim 8, said retaining means including one of said attaching means.

10. The fishing lure of claim 1, including ears provided on relatively opposite side edges of one of said members and having fish hooks engaged thereto.

* * * * *